United States Patent
Olier

(10) Patent No.: US 9,708,439 B2
(45) Date of Patent: Jul. 18, 2017

(54) COMPOSITION OF ALLOPHANATE AND HYDROPHOBIC RESIN

(71) Applicant: VENCOREX FRANCE, Saint-Priest (FR)

(72) Inventor: Philippe Olier, Lyons (FR)

(73) Assignee: VENCOREX FRANCE, Saint-Priest (FR)

( * ) Notice: Subject to any disclaimer, the term of this patent is extended or adjusted under 35 U.S.C. 154(b) by 214 days.

(21) Appl. No.: 14/426,627

(22) PCT Filed: Sep. 6, 2013

(86) PCT No.: PCT/EP2013/068493
§ 371 (c)(1),
(2) Date: Mar. 6, 2015

(87) PCT Pub. No.: WO2014/037514
PCT Pub. Date: Mar. 13, 2014

(65) Prior Publication Data
US 2015/0232607 A1    Aug. 20, 2015

(30) Foreign Application Priority Data

Sep. 7, 2012 (FR) ..................................... 12 58415

(51) Int. Cl.
| | |
|---|---|
| *C08G 18/74* | (2006.01) |
| *C08F 110/06* | (2006.01) |
| *C08F 136/06* | (2006.01) |
| *C08G 18/62* | (2006.01) |
| *C08G 18/73* | (2006.01) |

(52) U.S. Cl.
CPC ............ *C08G 18/74* (2013.01); *C08F 110/06* (2013.01); *C08F 136/06* (2013.01); *C08G 18/62* (2013.01); *C08G 18/6204* (2013.01); *C08G 18/73* (2013.01)

(58) Field of Classification Search
None
See application file for complete search history.

(56) References Cited

U.S. PATENT DOCUMENTS

| | | | |
|---|---|---|---|
| 5,124,427 A | 6/1992 | Potter et al. | |
| 5,688,860 A * | 11/1997 | Croft ................. | C08G 18/4054 521/122 |
| 6,103,851 A * | 8/2000 | Roser ................. | C08G 18/0885 264/241 |
| 2011/0263797 A1 | 10/2011 | Johnston et al. | |
| 2012/0016073 A1 * | 1/2012 | Bernard .............. | C08G 18/097 524/589 |

FOREIGN PATENT DOCUMENTS

| | | |
|---|---|---|
| EP | 0031207 A1 | 7/1981 |
| EP | 2289963 A3 | 3/2011 |
| FR | WO 2010067005 A1 * | 6/2010 ........... C08G 18/097 |
| WO | 2010-067005 A1 | 6/2010 |

OTHER PUBLICATIONS

Search Report and Written opinion issued by European Patent Office on Nov. 21, 2013.
Solvay-Rhodia: "Rhodasurf LA 30" Product Data Sheet:E90002118F.doc, May 2010.
International Preliminary Report on Patentability issued by European Patent Office on Dec. 23, 2014.
Search Report issued by French Patent Office on Apr. 4, 2013.

* cited by examiner

*Primary Examiner* — Christopher M Rodd
(74) *Attorney, Agent, or Firm* — Michael B. Fein; Eckert Seamans Cherin & Melott, LLC

(57) ABSTRACT

The invention relates to a composition for preparing (poly) urethane from an allophanate and from a hydrophobic resin. The invention also relates to the use of this composition as a replacement for poly(methylene diphenyl diisocyanate) (pMDI), in particular for the preparation of a material for encapsulating an electrical device.

19 Claims, No Drawings

COMPOSITION OF ALLOPHANATE AND HYDROPHOBIC RESIN

This application is the U.S. national stage of PCT/EP2013/068493 filed Sep. 6, 2013, which claims priority from French application 1258415 filed Sep. 7, 2012, both of which are hereby incorporated by reference.

DESCRIPTION

The invention relates to a composition for preparing (poly)urethane from an allophanate and from a hydrophobic resin.

The invention also relates to the use of this composition as a replacement for poly(methylene diphenyl diisocyanate) (pMDI), in particular for the preparation of a material for encapsulating an electrical device.

Allophanates are known intended for coating compositions. WO-2010/067005 describes a method for preparing allophanate as well as an allophanate and a composition comprising the allophanate and intended for the preparation of coating, in particular paint compositions.

Moreover, the use of (poly)isocyanates for preparing thermosetting compositions for making materials, for example for encapsulating electric devices or further for insulation, is known.

Generally, these systems or compositions comprise two portions. A first portion contains hydroxyl compounds, fillers, additives and a catalyst. The second portion contains the polyisocyanate.

During use, both portions are mixed and the mixture is cast into a mould comprising the device to be encapsulated.

The use of these cross-linkable compositions may take place quite rapidly after mixing both portions of the composition. Indeed, after a certain time, cross-linking is too advanced and makes the composition unusable.

The various elements making up the composition have to be perfectly compatible so as not to alter the final properties of the prepared material, notably the physical properties of the material. From among the parameters which have to be controlled, the viscosity is particularly important.

Moreover, the presence of water may lead to parasitic or secondary reactions with the isocyanate groups and cause formation of bubbles or defects in the final material.

The use of poly(methylene diphenyl diisocyanate) (pMDI) is known for preparing a material, notably for encapsulating an electric device.

EP-031207 describes the preparation of a liquid composition of diphenylmethane diisocyanate obtained by reaction of this isocyanate with a submolar amount of a particular mono-alkoxy polyalkylene glycol for which the molecular mass is 246 g/mol. The described reaction leads to products which are not allophanates. Further, the applied resin is not hydrophobic.

US-2011/0263797 describes the preparation of a sealant from polymers stemming from a diphenylmethane diisocyanate with allophanate units and from a polyether or polyol resin. The used resins are not hydrophobic.

U.S. Pat. No. 5,124,427 discloses a polyisocyanate used in a coating composition. This polyisocyanate is notably prepared from HDI and from ethylene glycol monomethylether or from methoxy-2-propanol.

EP-2 289 963 relates to a mixture of polyisocyanate and polyol for preparing polyurethane coatings. This mixture comprises allophanates and a hydroxy-styrene and (meth)acrylate polymer.

U.S. Pat. No. 5,688,860 relates to elastomers derived from polyisocyanates for encapsulating electric materials. These elastomers are prepared from polyurethanes or polyureas. Systematic use of a polyamine resin is indispensable.

None of these documents provides satisfactory solutions to the problems encountered by one skilled in the art.

Thus, there exists a need for other solutions for preparing cross-linkable compositions and in particular cross-linkable compositions useful for preparing a material for encapsulating an electric device. Indeed, this product may contain sometimes large amounts of methylene diphenyl isocyanate (MDI) which is classified as H 351 in the new GHS system (suspected to cause cancer). It is therefore recognized from now on that pMDI may have risks during its application, notably health risks.

Compositions for preparing (poly)urethanes with a high viscosity because of miscibility problems of their constituents are also known. Such an increased viscosity generally leads to trapping air bubbles which may lead to defects in the final material.

Known (poly)isocyanates have compatibility problems with resins, notably with hydrocarbon resins having hydroxyl functions such as for example hydroxylated polybutadiene (HTBP). These compatibility problems generally lead to uncontrolled cross-linking phenomena.

The compositions for preparing (poly)urethane should also be stable once they are prepared, notably by avoiding or by controlling the cross-linking of the applied resin with the hardener. Insufficient stability may lead to a drift in the viscosity because of uncontrolled cross-linking phenomena.

The fluidity of the compositions for preparing (poly)urethane is also a significant property, notably during their application for preparing cast resins.

The hydrophobicity of the prepared materials by means of compositions for preparing a (poly)urethane is also an important property.

The compromise between the capability of cross-linking the compositions for preparing a (poly)urethane and the compatibility between the isocyanate component and the applied resin, also is an essential parameter of these type of compositions.

Thus, the present invention provides a composition for preparing a (poly)urethane comprising at least one allophanate and at least one resin which may efficiently be applied for preparing a material, notably a material for encapsulating an electric device. The composition according to the invention is a thermosetting composition.

The invention also provides an efficient alternative to the use of pMDI.

The invention therefore gives the possibility of providing a solution for all or part of the problems related to the compositions for preparing (poly)urethane of the state of the art.

The composition according to the invention notably allows reduction, or even suppression of the risks of parasitic or secondary reactions during cross-linking in the presence of water.

The composition according to the invention advantageously allows preparation of a material, for example for encapsulating an electric device, with improved properties.

The invention also provides a composition for preparing (poly)urethane for which the viscosity is particularly advantageous. The composition according to the invention generally has very good miscibility with other components customarily used during the preparation of compositions for preparing (poly)urethane, for example additives such as resins or additives bearing OH functions, diols with low molecular weight, plasticizers, catalysts.

The composition according to the invention preferably essentially consists of an isocyanate component and of a hydrophobic resin, optionally additives. Thus, the composition according to the invention only comprises very small amounts of solvents, for example less than 10%, or even less than 5% by mass, and, preferably it does not comprise any free solvent.

Within the composition according to the invention, the applied allophanate has very good compatibility and very good miscibility with hydrocarbon resins, for example with HTBP.

The composition according to the invention advantageously allows the use of renewable substrates.

Thus, the invention provides a composition for preparing a (poly)urethane, for which the average functionality is greater than 2, and comprising (a) an isocyanate component of NCO functionality comprised between 1.9 and 2.7 and comprising at least one allophanate
with an NCO functionality equal to 2+/−5% and
of formula (I)

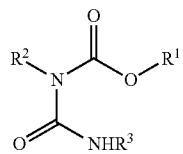

wherein
R$^1$ represents the residue of a mono-alcohol compound comprising an ether or polyether function after reaction of the hydrogen of the OH function with a compound having an isocyanate function;
R$^2$ and R$^3$, either identical or different, represent a hydrocarbon group, comprising a derived or non-derived isocyanate function;
(b) at least one hydrophobic resin with hydroxyl functions with a weight greater than 500 g/mol;
with OH functionality equal to 2 or greater than 2;
of solubility parameters with a value of less than 20.4 MPa$^{1/2}$ and different from a polyamine selected from acrylonitrile/butadiene copolymers with amine end functions and
selected from
a linear or branched poly-alkylene with hydroxyl groups;
a linear or branched poly-alkylene with hydroxyl end groups; preferably selected from
a linear or branched poly-propylene with hydroxyl groups;
a linear or branched poly-propylene with hydroxyl end groups;
a linear or branched poly-butadiene with hydroxyl groups;
a linear or branched poly-butadiene with hydroxyl end groups;
a linear or branched hydroxylated poly-butadiene.

According to the present invention, a non-derived isocyanate function is a free isocyanate function for which the NCO group is accessible. A derived isocyanate function is a function for which the NCO group is bound to another chemical group.

For the composition according to the invention, the average functionality corresponds to the total number of functions.
derived or non-derived and optionally masked isocyanates (NCO), present within the isocyanate component (a) and
hydroxyls (OH) present within the hydrophobic resin (b), divided by the total number of molecules bearing isocyanate functions within the isocyanate component (a) and of molecules bearing hydroxyl functions within the hydrophobic resin (b).

For the composition according to the invention, the molar ratio defined by (number of NCO functions/number of OH functions) ranges from 0.9 to 3; from 1 to 3; from 0.9 to 1.5; from 1 to 1.5; from 0.9 to 1.2 or from 1 to 1.2.

Advantageously, the composition according to the invention comprises an isocyanate component (a) with NCO functionality selected from an NCO functionality ranging from 1.9 to 2.5; an NCO functionality ranging from 1.9 to 2.3; an NCO functionality ranging from 1.9 to 2.2; an NCO functionality ranging from 1.9 to 2.1; an NCO functionality ranging from 2 to 2.5; an NCO functionality ranging from 2 to 2.3; an NCO functionality ranging from 2 to 2.2.

In a particularly advantageous way, the NCO functionality of the composition according to the invention is therefore equal to or close to 2 and up to 2.7. This NCO functionality may sometimes vary around this value of 2, notably according to the particular conditions for preparing the allophanate of formula (I).

Preferably, the composition according to the invention therefore comprises at least one allophanate of formula (I) for which the NCO functionality ranges from 1.9 to 2.1 or for which the NCO functionality ranges from 1.95 to 2.05.

For the allophanate of formula (I) of the composition according to the invention, R$^1$ represents the residue of a mono-alcohol compound comprising an ether or a polyether function. Preferably, this mono-alcohol comprises an ether or a polyether function, advantageously a (poly)(alkyleneoxide), preferably (poly)(ethyleneoxide) function, in particular an ethylene polyoxide monoether advantageously including on average at most 10 of ethylene oxide moieties. Advantageously, this mono-alcohol on average comprises less than 5 alkylene oxide moieties. Preferably, it comprises on average 2 to 3 alkylene oxide moieties.

Advantageously, the mono-alcohol is selected from alcohols with an aliphatic chain, notably alcohols with a cycloaliphatic chain and preferably alcohols with a linear alkyl chain or alcohols with a slightly branched alkyl chain comprising a single OH function. This may be a heterocyclic alcohol of the oxetane type. An alkyl chain is slightly branched if it does not comprise any tertiary and neopentyl carbon atom.

Very advantageously, the mono-alcohol is selected from alcohols with a linear or slightly branched aliphatic chain, with a C$_2$ length or more or a C$_5$ length or more.

The suitable alcohols may also optionally comprise one or several double bonds.

Other particularly advantageous alcohols from the point of view of low viscosity are the compounds of formula (II)

wherein
T represents a linear C$_1$-C$_{20}$-alkyl group or a branched C$_1$-C$_{20}$-alkyl group, a group of formula Q-CO— in which Q represents a linear C$_1$-C$_{20}$-alkyl group or a branched C$_1$-C$_{20}$-alkyl group;

n represents an integer, advantageously an integer ranging from 1 to 10, preferably ranging from 1 to 5;

L represents H or an alkyl group or a $C_1$-$C_8$-alkyl group, notably a methyl group, or a polyether group, notably a group of formula —$CH_2OG$ wherein G represents a hydrocarbon chain, notably a polyoxyalkylene chain, preferably a polyoxyethylene chain.

Preferably for the composition according to the invention, $R^1$ represents the residue of a mono-alcohol compound selected from the compounds of formula (II).

For the composition according to the invention, the aliphatic chain of the residue from a mono-alcohol may further be substituted or interrupted by a cycloalkyl group or by a heterocyclic group.

It is also possible to use derivatives of the silanol type as compounds providing the group $R^1$ of the allophanate of the composition according to the invention.

According to the invention, the allophanate is preferably an allophanate of formula (I) wherein $R^2$ and $R^3$, either identical or different, represent a group comprising a derived or non-derived isocyanate function and selected from an aliphatic, cycloaliphatic, heterocyclic or aromatic hydrocarbon group, preferably an aliphatic hydrocarbon group comprising a derived or non-derived isocyanate function, for example a group of formula —$(CH_2)_6$—.

Advantageously, the isocyanate function may be a derived isocyanate function which is different from an isocyanurate function and which is selected from carbamate, urea, biuret, urethane, uretinedione, acyl urea, masked isocyanate, allophanate functions.

According to the invention, the allophanate may be a homo-allophanate or allophanate of formula (I) wherein $R^2$ and $R^3$ are identical.

According to the invention, the allophanate may also be a mixed allophanate or an allophanate of formula (I) wherein $R^2$ and $R^3$ are different.

For the composition according to the invention, the isocyanate component may comprise a mixture of allophanates which comprises at least 25% by mass, advantageously at least 33% by mass, preferably at least 50% by mass of at least one monoallophanate.

The composition according to the invention may also comprise a mixture of allophanates comprising at least one allophanate selected from a bis-allophanate, a tris-allophanate, one or several heavy allophanates, as well as in a minority, of a carbamate of isocyanate $R^2NCO$ and alcohol $R^1OH$ or of a carbamate of isocyanate $R^3NCO$ and alcohol $R^1OH$ or of a carbamate of isocyanates $R^2NCO$ and $R^3NCO$ and of an alcohol $R^1OH$.

According to the invention, the hydrophobic resin of the composition according to the invention is not a polyamine selected from acrylonitrile/butadiene copolymers with amine end functions.

Advantageously, the composition according to the invention comprises a hydrophobic resin with an OH functionality ranging from 2 to 25; with an OH functionality ranging from 2 to 15; with an OH functionality ranging from 2 to 10; with an OH functionality ranging from 2 to 5; with an OH functionality ranging from 2.1 to 25; with an OH functionality ranging from 2.1 to 15; with an OH functionality ranging from 2.1 to 10; with an OH functionality ranging from 2.1 to 5.

The molar weight of the hydrophobic resin of the composition according to the invention is greater than 500 g/mol. Preferably, the hydrophobic resin is a hydrophobic resin for which the molar weight is greater than 1,000 g/mol.

This molar weight may notably range from 1,000 to 20,000 g/mol, preferably from 1,000 to 10,000 g/mol.

Preferably, the hydrophobic resin is a resin for which the solubility parameters have a value of less than 18.4 $MPa^{1/2}$ or less than 16.4 $MPa^{1/2}$ or comprised between 16.4 and 18.4 $MPa^{1/2}$.

According to the invention, the hydrophobic resin comprises several hydroxyl functions. These hydroxyl functions may be present within the chemical structure of the resin or be in end positions.

As a hydrophobic resin according to the invention, linear or branched hydroxyl-terminated polybutadiene (PBHT) is preferred, notably linear hydroxyl-terminated polybutadiene.

The composition according to the invention comprises an isocyanate component (a) mainly based on at least one allophanate with a NCO functionality equal to 2+/−5% and of formula (I). This isocyanate component may also comprise one or several other allophanates but also one or several other (poly)isocyanates, for example at least one polyfunctional isocyanate tricondensate (c).

Moreover, the composition according to the invention may comprise at least one additive of the polyol type and different from the resin (b).

The composition according to the invention may also simultaneously comprise at least one polyfunctional isocyanate tricondensate (c) and at least one additive of the polyol type and different from the resin (b).

According to the invention, the polyfunctional isocyanate tricondensate (c) is preferably selected from the compounds of formula (III):

(III)

wherein $R^4$, $R^5$ and $R^6$ represent independently an aliphatic, cycloaliphatic, heterocyclic or aromatic heterocarbon or a hydrocarbon group comprising a derived or non-derived isocyanate function;

m represents 0, 1 or 2;

A represents a group selected from an isocyanurate group, an imino oxadiazine dione group, an oxadiazine trione group, a biuret group of formulae (A1) to (A4) respectively,

(A1)

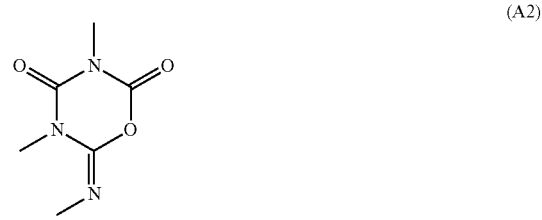

(A2)

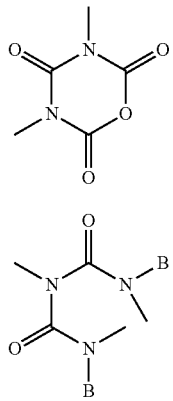

(A3)

(A4)

wherein B represents independently a hydrogen atom; a hydrocarbon group; a $C_1$-$C_{20}$ hydrocarbon group; a heterocarbon group comprising at least one heteroatom selected from O, N, S, Si; a $C_1$-$C_{20}$ heterocarbon group comprising at least one heteroatom selected from O, N, S, Si; a group of formula (B1)

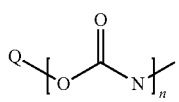

(B1)

wherein n represents 3 or 4 and Q represents a group selected from a hydrocarbon group, an alkoyl group, a hydrocarbon group, an aliphatic, cycloaliphatic, heterocyclic or aromatic heterocarbon group, comprising a derived or non-derived isocyanate function. Preferably according to the invention, the polyfunctional isocyanate tricondensate (c) is a real polyisocyanate isocyanurate.

The isocyanate component (a) of the composition according to the invention may comprise at least one polyfunctional isocyanate tricondensate (c) according to the characteristics:
(i) the weight ratio between the allophanate of the isocyanate component (a) and the polyfunctional isocyanate tricondensate (c) ranges from 60/40 to 90/10, from 30/70 to 90/10, from 60/40 to 80/20, from 30/70 to 80/20, from 60/40 to 85/15, from 30/70 to 85/15;
(ii) the polyfunctional isocyanate tricondensate (c) stems from a tricondensation reaction for which the transformation rate of the isocyanate monomers, either identical or different, into the polyfunctional polyisocyanate tricondensate is greater than 8% or greater than 10% or greater than 15%;
(iii) the polyfunctional isocyanate tricondensate (c) comprises between 1 and 99% by weight of biuret or between 2 and 75% by weight of biuret;
the combinations (i) and (ii), (i) and (iii), (ii) and (iii) or (i), (ii) and (iii).

The composition and the isocyanate component (a) according to the invention have improved properties relatively to the compositions or isocyanates of the state of the art. These properties may be applied in many technical fields as well as within the scope of various uses.

Thus, the invention also relates to the use of an isocyanate component (a) or of an allophanate according to the invention as a hardener of a hydrophobic resin, in particular of a hydrophobic resin according to the invention.

The preferred use according to the invention is applied during the preparation of polyurethane or of a polyurethane material.

The invention therefore also relates to the use of a composition according to the invention for preparing a (poly)urethane, notably for preparing a (poly)urethane material for encapsulation or further for preparing a (poly)urethane material for encapsulating an electric device.

The invention also relates to an electric device encapsulated by means of a (poly)urethane prepared from a composition according to the invention.

Moreover, the invention also relates to the use of an isocyanate component (a) or of an allophanate according to the invention for replacement of the poly(methylene diphenyl diisocyanate) (pMDI) in the preparation of a (poly)urethane from a hydrophobic resin according to the invention. Such a use is particularly useful for preparing a (poly)urethane as an encapsulation material or as an electric encapsulation material.

The various aspects and the advantageous properties of the invention may be illustrated by the following examples. These examples are not a limitation in the scope of this invention.

EXAMPLE 1

Equipment

The polyisocyanate P1 was prepared according to the method described in WO-2010/067005 from Rhodasurf LA30 (Rhodia) and from hexamethylene diisocyanate. The main characteristics of this product are:
NCO functionality: 12.6%,
dynamic viscosity (at 25° C.): 130 mPa·s,
density: 1.13.

The polyisocyanate P2 according to the invention is a mixture (60/40 v/v) of polyisocyanate P1 with Tolonate HDT (Perstorp) which is a polyisocyanate prepared from hexamethylene diisocyanate. The main characteristics of this product are:
NCO functionality: 16.5%,
dynamic viscosity (at 25° C.): 363 mPa·s,
density: 1.13.

PolyBD 45R HTO (Cray Valley) is a poly-butadiene with end hydroxyls (HTPB) of formula:

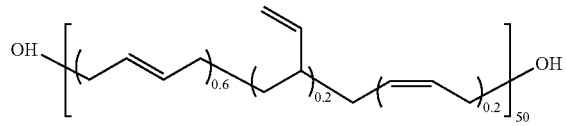

The main characteristics of this product are:
OH functionality: 1.39%,
dynamic viscosity (at 25° C.): 6 665 mPa·s,
density: 0.9.

Tolonate HDT-LV2 (Perstorp) is a polyisocyanate prepared from hexamethylene diisocyanate. The main characteristics of this product are:
NCO functionality: 23%,
dynamic viscosity (at 25° C.): 600 mPa·s,
density: 1.13.

Desmodur VL (Bayer) is a polyisocyanate prepared from a polymer of methylene diphenyl diisocyanate. The main characteristics of this product are:

NCO functionality: 31.5%,
dynamic viscosity (at 25° C.): 91 mPa·s,
density: 1.24.

Results

The viscosity of a mixture of at least two liquids may be calculated by the Refutas equation, by considering that the miscibility of two components is complete. Depending on whether the obtained experimental results are consistent with the calculated data, the miscibility of the components of the mixture will be determined.

The first step consists in calculating the viscosity index (viscosity blending index–VBI) for each component of the mixture:

$$VBN = 14.534 \times \ln[\ln(v+0.8)] + 10.975$$

wherein v represents the viscosity in centistokes.

The following step consists in calculating the viscosity index of the mixture (viscosity blending index–VBI-blend):

$$VBN_{Blend} = [x_A \times VBN_A] + [x_B \times VBN_B] + \ldots + [x_N \times VBN_N]$$

Finally, the viscosity of the mixture is obtained by means of the equation:

$$v = \exp\left(\exp\left(\frac{VBN_{Blend} - 10.975}{14.534}\right)\right) - 0.8,$$

HTPB and polyisocyanates are mixed in different ratios by means of a spatula, in particular in ratios for which HTPB is a majority and represents at least 50% of the mixture, or even between 70 and 90% of the mixture.

The dynamic viscosity (at 25° C.) is measured and then converted into a kinematic viscosity value from the respective densities of the products and of the mixtures.

Finally, comparisons are made.

COMPARATIVE EXAMPLE 1.1

HTPB and Tolonate HDT-LV2 Mixture

| Amount of HTPB (% by mass) | Calculated viscosity of the mixture (mm² · s⁻¹) | Measured viscosity of the mixture (mm² · s⁻¹) |
|---|---|---|
| 100 | 7405 | 7405 |
| 90 | 5448 | 6595 |
| 80 | 4050 | 6286 |
| 70 | 3042 | 6035 |
| 60 | 2307 | 5540 |
| 50 | 1767 | 2151 |
| 30 | 1064 | 1338 |

EXAMPLE 1.2

HTPB and Polyisocyanate P1 Mixture

| Amount of HTPB (% by mass) | Calculated viscosity of the mixture (mm² · s⁻¹) | Measured viscosity of the mixture (mm² · s⁻¹) |
|---|---|---|
| 100 | 7405 | 7405 |
| 90 | 4300 | 5247 |
| 80 | 2582 | 4159 |
| 70 | 1600 | 3013 |
| 60 | 1020 | 2434 |
| 50 | 668 | 1684 |
| 30 | 309 | 752 |

EXAMPLE 1.3

HTPB and Polyisocyanate P2 Mixture

| Amount of HTPB (% by mass) | Calculated viscosity of the mixture (mm² · s⁻¹) | Measured viscosity of the mixture (mm² · s⁻¹) |
|---|---|---|
| 100 | 7405 | 7405 |
| 90 | 5070 | 5862 |
| 80 | 3529 | 4864 |
| 70 | 2495 | 4261 |
| 60 | 1790 | 3208 |
| 50 | 1302 | 2337 |
| 30 | 717 | 1104 |

EXAMPLE 1.4

HTPB and Desmodur VL Mixture

| Amount of HTPB (% by mass) | Calculated viscosity of the mixture (mm² · s⁻¹) | Measured viscosity of the mixture (mm² · s⁻¹) |
|---|---|---|
| 100 | 7405 | 7405 |
| 90 | 3953 | 5874 |
| 80 | 2207 | 4875 |
| 70 | 1283 | 3990 |
| 60 | 775 | 3285 |
| 50 | 485 | 1578 |
| 30 | 209 | 543 |

The viscosities measured for the HTPB mixtures with polyisocyanates P1 and P2 are the closer to the calculated viscosities. Better compatibility between HTPB and these polyisocyanates P1 and P2 is therefore seen like with the other polyisocyanates.

In particular, for a constant ratio of the NCO functionalities/OH functionalities (NCO/OH=1.03), the mixtures based on polyisocyanates P1 and P2 have lower viscosities than the mixtures based on Desmodur VL and Tolonate HDT-LV2 whereas the viscosity of Desmodur VL is lower than that of the polyisocyanates P1 and P2.

| | Tolonate HDT-LV2 | Desmodur VL | Polyisocyanates P1-P2 |
|---|---|---|---|
| HTPB (%) | 14 | 11 | 23-19 |
| Polyisocyanate (%) | 86 | 89 | 77-81 |
| Viscosity (mm² · s⁻¹) | 6140 | 5870 | 4129-4810 |

The invention claimed is:

1. A composition for preparing a (poly)urethane, the average functionality of which is greater than 2, comprising
(a) an isocyanate component with an NCO functionality comprised between 1.9 and 2.7 and comprising at least one allophanate
with an NCO functionality equal to 2+/−5% and of formula (I)

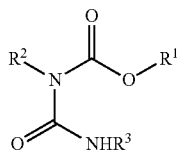

wherein
R¹ represents the residue of a mono-alcohol compound comprising an ether or polyether function after reaction of the hydrogen of the OH function with a compound with an isocyanate function;
R² and R³, either identical or different, represent a hydrocarbon group, comprising a derived or non-derived isocyanate function;
(b) at least one hydrophobic resin with hydroxyl functions
with a molar weight of more than 500 g/mol;
with an OH functionality equal to 2 or greater than 2;
of solubility parameters with a value of less than 20.4 MPa$^{1/2}$ and
different from a polyamine selected from the group consisting of acrylonitrile/butadiene copolymers with amine end functions,
selected from the group consisting of
a linear or branched poly-propylene with hydroxyl groups;
a linear or branched poly-propylene with hydroxyl end groups;
a linear or branched hydroxylated poly-butadiene with hydroxyl groups;
a linear or branched hydroxylated poly-butadiene with hydroxyl end groups; and
a linear or branched hydroxylated poly-butadiene.

2. The composition according to claim 1, wherein the molar ratio defined by (number of NCO functions/number of OH functions) ranges from 0.9 to 3; from 1 to 3; from 0.9 to 1.5; from 1 to 1.5; from 0.9 to 1.2 or from 1 to 1.2.

3. The composition according to claim 1, comprising an isocyanate component (a) with NCO functionality selected from the group consisting of an NCO functionality ranging from 1.9 to 2.5; an NCO functionality ranging from 1.9 to 2.3; an NCO functionality ranging from 1.9 to 2.2; an NCO functionality ranging from 1.9 to 2.1; an NCO functionality ranging from 2 to 2.5; an NCO functionality ranging from 2 to 2.3; and an NCO functionality ranging from 2 to 2.2.

4. The composition according to claim 1, comprising at least one allophanate with NCO functionality ranging from 1.95 to 2.05.

5. The composition according to claim 1, wherein
R¹ represents the residue of a mono-alcohol compound selected from the group consisting of components of formula (II)

wherein
T represents a linear C₁-C₂₀ group or a branched C₁-C₂₀-alkyl group, a group of formula Q-CO— wherein Q represents a linear C₁-C₂₀-alkyl group or a branched C₁-C₂₀-alkyl group;
n represents an integer ranging from 1 to 10; and
L represents H, an alkyl group, or a polyether group; and R² and R³, either identical or different, represent a hydrocarbon group comprising a derived or non-derived isocyanate function wherein the hydrocarbon group is selected from the group consisting of an aliphatic, cycloaliphatic, heterocyclic and aromatic hydrocarbon group.

6. The composition according to claim 1, wherein the derived isocyanate function is different from an isocyanurate function and is selected from the group consisting of carbamate, urea, biuret, urethane, uretinedione, acyl urea, masked isocyanate, and allophanate functions.

7. The composition according to claim 1, wherein the allophanate is a homo-allophanate, R² and R³ being identical, or wherein the allophanate is a mixed allophanate, R² and R³ being different.

8. The composition according to claim 1, comprising a mixture of allophantes comprising at least 25% by mass of at least one mono-allophanate.

9. The composition according to claim 1, wherein the at least one allophanate comprises a mixture of allophanates comprising at least one allophanate selected from the group consisting of bis-allophanate and tris-allophanate.

10. The composition according to claim 1, comprising a hydrophobic resin with an OH functionality selected from the group consisting of a an OH functionality ranging from 2 to 25; an OH functionality ranging from 2 to 15; an OH functionality ranging from 2 to 10; an OH functionality ranging from 2 to 5; an OH functionality ranging from 2.1 to 25; an OH functionality ranging from 2.1 to 15; an OH functionality ranging from 2.1 to 10; and an OH functionality ranging from 2.1 to 5.

11. The composition according to claim 1, comprising a hydrophobic resin wherein the molecular weight is greater than 1,000 g/mol.

12. The composition according to claim 1, comprising a hydrophobic resin wherein the solubility parameters have a value of less than 18.4 MPa$^{1/2}$ or less than 16.4 MPa$^{1/2}$ or comprised between 16.4 and 18.4 MPa$^{1/2}$.

13. The composition according to claim 1, also comprising at least one polyfunctional isocyanate tricondensate (c) or at least one additive of the polyol type and different from the resin (b) or simultaneously at least one polyfunctional isocyanate tricondensate (c) and at least one additive of the polyol type and different from the resin (b).

14. The composition according to claim 1, further comprising at least one polyfunctional isocyanate tricondensate (c) selected from the group consisting of a compounds of formula (III):

wherein
R⁴, R⁵ and R⁶ represent independently an aliphatic, cycloaliphatic, heterocyclic or aromatic heterocarbon or hydrocarbon group, comprising a derived or non-derived isocyanate function;
m represents 0, 1 or 2;
third bullet point, A represents a group selected from the group consisting of an isocyanurate group, an imino oxadiazine dione group, an oxadiazine trione group, and a biuret group of formulae (A1) to (A4) respectively,

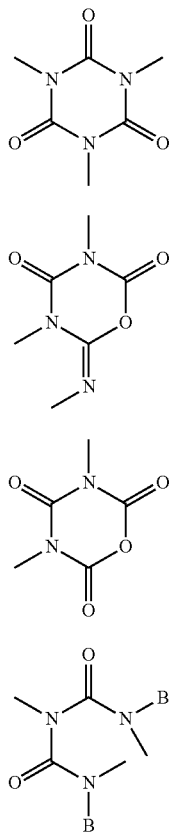

(A1)

(A2)

(A3)

(A4)

wherein B represents independently a radical selected from the group consisting of hydrogen; a $C_1$-$C_{20}$ hydrocarbon group; a heterocarbon group comprising at least one heteroatom selected from the group consisting of O, N, S, and Si; a $C_1$-$C_{20}$ heterocarbon group comprising at least one heteroatom selected from the group consisting of O, N, S, and Si; and a group of formula (B1)

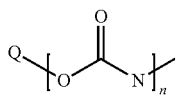

(B1)

wherein n represents 3 or 4 and Q represents a group selected from the group consisting of a hydrocarbon group, an alkoyl group, a hydrocarbon group, an aliphatic, cycloaliphatic, and a heterocyclic or aromatic heterocarbon group, comprising a derived or non-derived isocyanate function.

15. The composition according to claim 1, further comprising at least one polyfunctional isocyanate tricondensate (c) which is a non-derivatized polyisocyanate isocyanurate.

16. The composition according to claim 1 further comprising at least one polyfunctional isocyanate tricondensate (c) having one or more of the following characteristics:
 (i) the weight ratio between the allophanate of the isocyanate component (a) and the polyfunctional isocyanate tricondensate (c) having a range selected from the group consisting of from 60/40 to 90/10, from 30/70 to 90/10, from 60/40 to 80/20, from 30/70 to 80/20, from 60/40 to 85/15, and from 30/70 to 85/15;
 (ii) the polyfunctional isocyanate tricondensate (c) stems from a tricondensation reaction wherein the transformation rate of the isocyanate monomer(s), either identical or different, into polyfunctional polyisocyanate tricondensate is selected from the group consisting of greater than 8%, greater than 10%, and greater than 15%; and
 (iii) the polyfunctional isocyanate tricondensate (c) comprises between 1 and 99% by weight of biuret or between 2 and 75% by weight of biuret.

17. A method comprising hardening the composition of claim 1.

18. A method comprising encapsulating an electric device with a (poly)urethane prepared by reacting the composition of claim 1.

19. An electric device encapsulated according to the method of claim 18.

* * * * *